Jan. 19, 1943.  W. C. SKAREEN  2,308,898
MECHANISM CONTROL
Filed Nov. 12, 1941   3 Sheets-Sheet 1
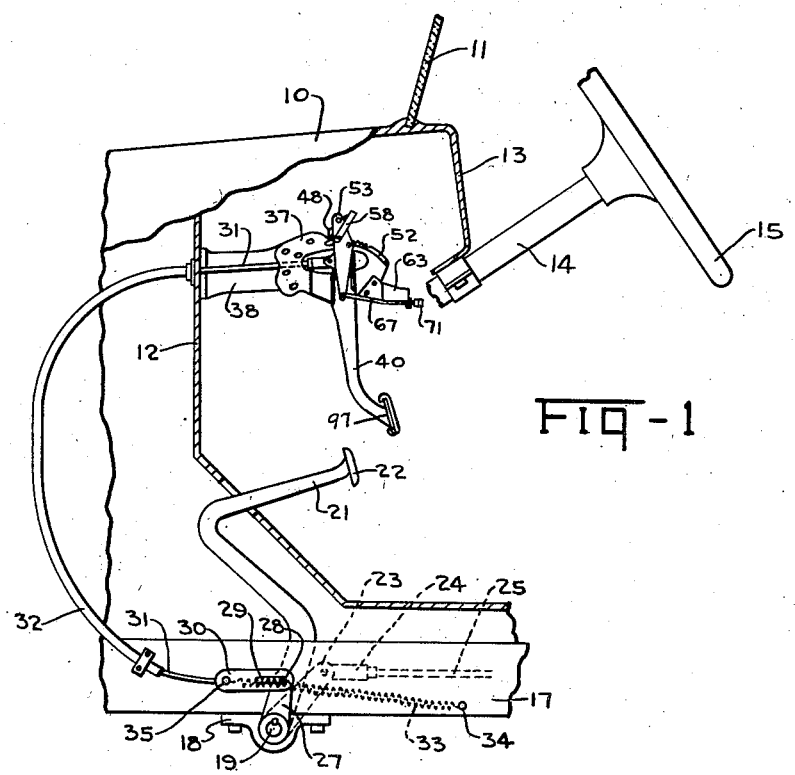
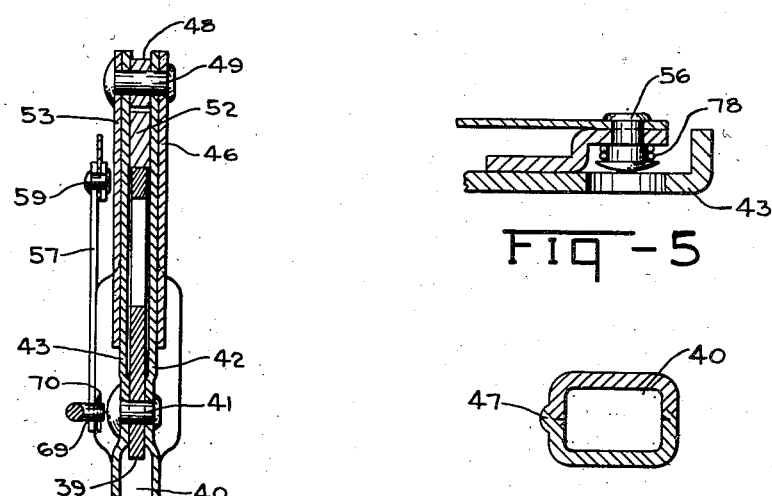
INVENTOR
Willard C. Skareen
BY
Braselton, Whitcomb Davies

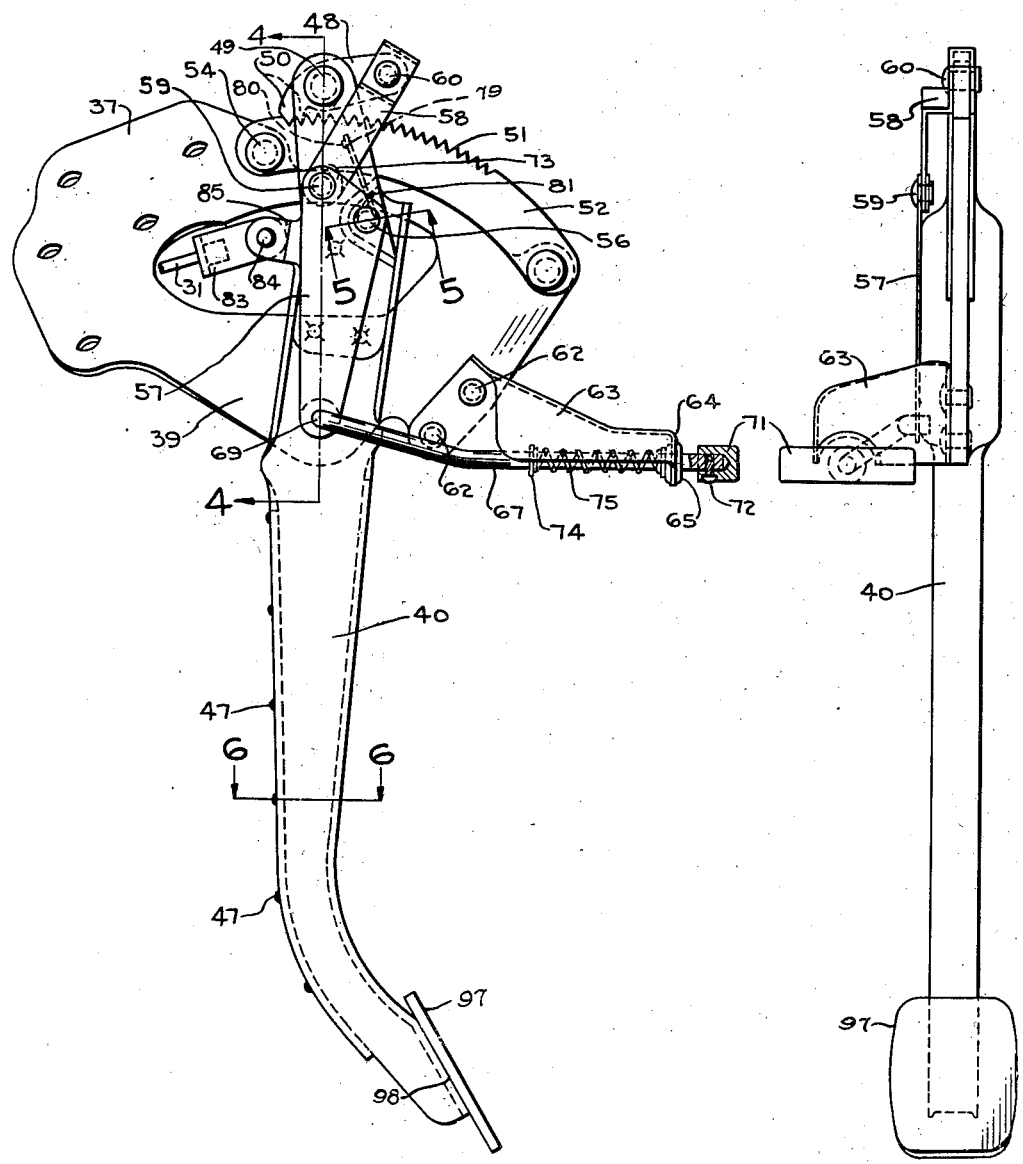

Jan. 19, 1943.  W. C. SKAREEN  2,308,898
MECHANISM CONTROL
Filed Nov. 12, 1941  3 Sheets-Sheet 3
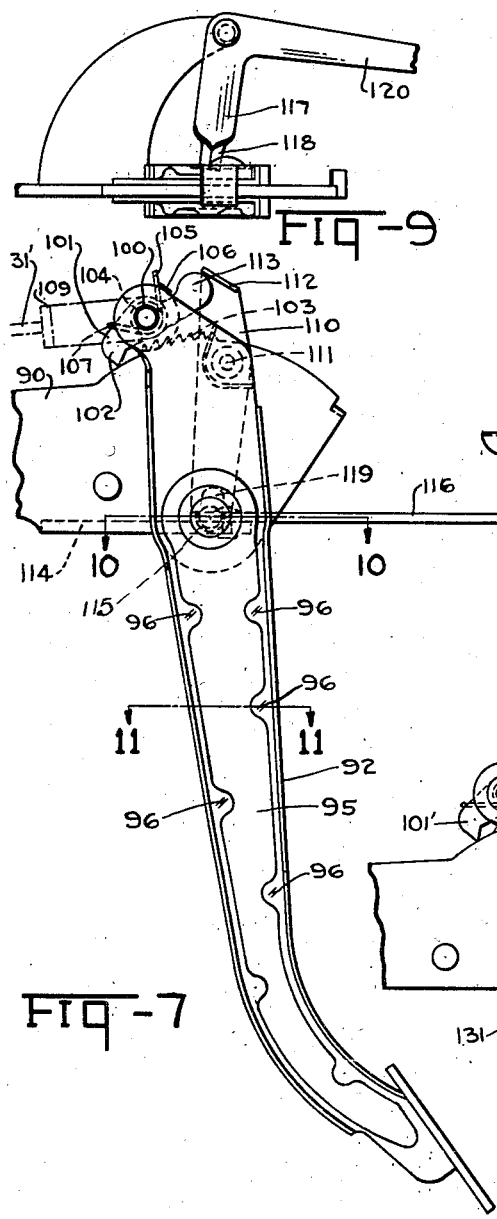
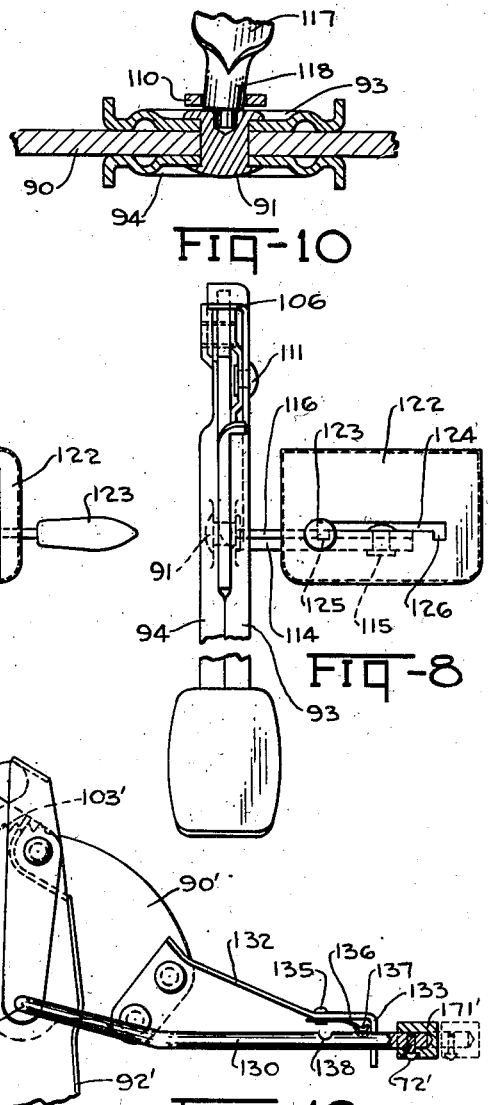
INVENTOR
Willard C. Skareen
BY
Braselton, Whitcomb & Davies Patented Jan. 19, 1943

2,308,898

UNITED STATES PATENT OFFICE 2,308,898

MECHANISM CONTROL

Willard C. Skareen, Toledo, Ohio, assignor to The Bingham Stamping Company, Toledo, Ohio, a corporation of Ohio Application November 12, 1941, Serial No. 418,761

11 Claims. (Cl. 74—529)

This invention relates to a control mechanism or actuating apparatus, and more particularly to a mechanism and apparatus for actuating or controlling braking mechanism of an automotive vehicle.

The invention has for an object the provision of a foot operated lever arrangement embodying a clutching means of such nature that the lever arrangement may be retained in any position of adjustment and yet may be manually released with very little effort.

The invention is inclusive of a mechanism control including a lever and clutch arrangement of simple yet effective construction including foot operated lever mechanism and manually operated clutch releasing means, the latter being so arranged that the clutching means for retaining the lever mechanism in adjusted position may be rendered effective or ineffective at will.

A further object of the invention is the provision of a lever mechanism wherein the major parts are formed from sheet material thus effecting substantial reduction in cost and assembly and enhancing the uniformity and interchangeability of parts.

A further object of the invention resides in the provision of an emergency brake actuating pedal lever which depends from a point adjacent the instrument panel in which the lever retaining means comprises a locking device which may be released with the pedal lever in any position, and a manual control means for the locking device arranged to render said locking device effective or ineffective.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a fragmentary elevational view partly in section showing a portion of the operator's compartment of the vehicle showing one form of control mechanism of my invention embodied therein;

Figure 2 is a side elevational view of the form of the invention shown in Figure 1;

Figure 3 is a front elevational view of the arrangement shown in Figure 2;

Figure 4 is a fragmentary sectional view taken substantially on the line 4—4 of Figure 2;

Figure 5 is a fragmentary detailed sectional view taken substantially on the line 5—5 of Figure 2;

Figure 6 is a detailed sectional view taken on the line 6—6 of Figure 2;

Figure 7 is a view similar to Figure 2 showing a modified form of the invention;

Figure 8 is a front elevational view of the form of the invention shown in Figure 7;

Figure 9 is a top plan view of the arrangement shown in Figure 7;

Figure 10 is a sectional view taken substantially on the line 10—10 of Figure 7;

Figure 11 is a sectional view taken on the line 11—11 of Figure 7;

Figure 12 is a fragmentary side elevational view showing a modified form of manual release means for the lever arrangement.

While I have shown the arrangement of the control mechanism of my invention as utilized for actuating the emergency brakes of an automotive vehicle, it is to be understood that I contemplate the use of my invention with any apparatus wherein the same may be found to have utility.

Referring to the drawings in detail, and first with respect to Figure 1 there is illustrated a portion of an operator's or driver's compartment of the vehicle wherein numeral 10 designates the cowl portion, 11 a windshield, 12 the dashboard, 13 the conventional instrument panel, 14 a steering post and 15 a steering wheel. A portion of the vehicle chassis frame is illustrated as at 17, the same carrying a bracket 18 upon which is journalled a transversely extending shaft 19. Secured to the shaft 19 is a service brake pedal or member 21 having a foot pad actuating portion 22. Also secured to the shaft 19 is an arm 23 which is connected by means of a clevis 24 and a rod 25 to the brake mechanism of the vehicle (not shown). Secured to shaft 19 is a second arm 27, having a pin 28 at its extremity which is received in a slot 29 of a member 30, the latter being secured at one end to the end of a flexible cable 31 which is positioned within a suitable sheath or guide 32. A spring 33 has one end thereof secured as at 34 to the frame, the other end being connected as at 35 to member 30.

The arrangement is inclusive of a support or member 37 carried by a member 38, the latter being supported by the dashboard 12 or other suitable portion of the vehicle. The support 37 is preferably formed with a vertically positioned uniplanar portion 39 which pivotally supports a depending lever member 40 by a pin or rivet 41 passing through member 39 and through the side walls 42 and 43 of the lever member as particularly shown in Figure 3. The lever member is inclusive of a body portion terminating in a foot pad 44 which may be covered by means of a rubber pad 45 as shown in Figure 1. In the form of the invention shown in Figures 1 through 6 inclusive, the lever or lever member 40 is preferably made of a single sheet of metal formed to the configuration illustrated in Figures 2, 3 and 6 with the meeting edges welded together as at 47 in order to lend strength to the lever member. The upper extremity of the lever member is formed with spaced parallel side walls 42 and 43 straddling the uniplanar portion 39 of the support 37. The side walls 42 and 43 are reinforced by means of plates 46 and 53 which are suitably spot welded or otherwise fixedly secured to the lever side walls. Positioned between the upper extremities of walls 42 and 43 of the lever is a pawl or clutch member 48 pivotally supported upon a stub shaft or rivet 49. The pawl member 48 is preferably formed with a pair of pawl teeth 50 arranged for clutching engagement with a serrated surface 51 of a member or bar 52 the latter being fixedly secured to the support 37 by means of rivets 54. The walls 42 and 43 of the lever member also straddle the bar 52 as shown in Figure 4.

Pivotally carried by the lever member 40 upon a rivet 56 is a member or bell crank 57, to the upper portion of which is pivotally connected a link 58 by means of a pin or rivet 59, the other end of the link being connected to the pawl member 48 by means of a rivet 60. The lower end of the member 57 is provided with a circular opening, the axis of the opening being in alignment with the axis of the shaft 41 which forms the fulcrum of the lever 40. Secured to the uniplanar portion 39 of support 37 by means of rivets 62 is a bracket 63 which terminates in a depending portion 64 the latter having an opening to receive a grommet 65. Projecting through the grommet 65 is a manipulating rod 67 for the member 57 which has a transversely extending extremity 69 which projects through the opening in the end of member 57 and is held therein by means of a cotter key 70. The other end of rod 67 is provided with a manipulating handle 71 which is held in place on the rod by means of a pin 72. Secured upon the rod 67 in a circumferential groove is a collar 74 which forms an abutment for one end of an expansive spring 75 surrounding the rod 67 and serves to maintain rod 67 and bell crank lever 57 normally in the position shown in Figure 2. Means are provided for resiliently urging the pawl teeth 50 into engagement with the serrated clutching surface 51 comprising a spring 78 surrounding the pin 56, one end 79 of the spring projecting through an opening 80 in the link 58, the other end 81 being hooked over the upper edge of the bell crank lever 57. The link 58 is formed with an elongated slot 73 through which the pin 59 projects so as to permit longitudinal movement of the link 58 independently of the bell crank lever 57 so that the pawl 48 may over-ride the teeth 51 of the bar 52 without moving bell crank 57 when the lever 40 is moved in a clockwise direction as viewed in Figure 2 to "brake setting" position.

The braking mechanism of the vehicle is connected to the lever or pedal 40 by means of the flexible cable 31 connected to a clevis 83 which is connected by means of a pin 84 to a pair of ears 85 formed integrally with the side walls 42 and 43 of the lever 40.

In the operation of this form of the invention, the vehicle operator desiring to "set" the brakes, rotates the pedal lever 40 in a clockwise direction as viewed in Figure 2 about its axis or fulcrum 41, by foot pressure upon the pad 44, thus exerting a pull upon the cable 31. During the movement of lever 40 to effect a setting of the brakes, the pawl 48 over-rides the teeth 51 on the bar 52 and through the lost motion connection of slot 73 and pin 59 no relative movement is transmitted to bell crank 57 or manipulating rod 67. When the brakes have been "set," the pawl teeth 50 engage teeth 51 to retain the lever 40 in "brake setting" position.

When a release of the brakes is to be effected, the operator grasps the handle or member 71 and exerts a longitudinal pull on rod 67 which rotates the bell crank 58 in a counter-clockwise direction about the pivotal axis of pin 56. This movement causes a downward movement of the link 58 which rotates pawl 48 about pin 41 and disengages pawl teeth 50 from teeth 51 and the lever 40 returns to the "brake released" position as illustrated in Figure 2 under the influence of spring 33.

It is to be noted that with point of connection of rod 67 with bell crank 57 in alignment with the fulcrum 41 of the pedal lever 40, the movement of lever 40 does not cause any appreciable relative movement of bell crank 57 so that the lever 40 may be released in any position of adjustment.

In the form of the invention illustrated in Figures 7 through 11, there is provided a support 90 to which is fulcrumed upon a pin or rivet 91 a pedal lever construction 92. The lever 92 is formed of a pair of channel-shaped members 93 and 94 with the bight portions thereof juxtaposed as illustrated in Figure 11. The members 93 and 94 are integrally formed with raised portions or ribs 95 for strengthening the lever. The engaging portions of the members 93 and 94 are welded together as at 96, and a foot pad 97 secured to the depending end of the lever member by welding 98 or other suitable securing means.

The sections of the lever member are separated at the upper portion as shown in Figure 10 and straddle the support 90. The upper extremities of the lever sections are formed with aligned openings to receive a pin 100 upon which is pivoted a pawl 101 having a pawl tooth 102 arranged for cooperation with a serrated or clutching surface 103 associated with the support 90, the pawl member 101 being positioned between the side walls 93 and 94 of the lever. The pawl 101 is resiliently urged into engagement with clutching surface 103 by means of a coil spring 104, one end 105 of the spring engaging a projection 106 formed on lever section 94, the other end 107 of the spring being bent over the pawl member 101.

The pin 100 also serves to connect a clevis 109 to the pedal lever, the clevis being connected to the brake operating cable 31'.

Means are provided for releasing the lever retaining pawl 101 comprising an arm 110 pivoted to the lever section 93 by means of a rivet 111, the upper end of the arm having a transversely extending portion 112 arranged to engage the end 113 of pawl 101 upon relative pivotal movement of the arm 110. The support 90 is formed with a laterally extending portion 114 having an opening in its extremity receiving a rivet 115 upon which is pivoted an L-shaped manipulating member 116. As particularly shown in Figure 10, one arm 117 of member 116 is formed into tubular configuration 118 adjacent its end portion, the tubular configuration extending into an elongated slot 119 provided in the lower portion of the arm 110. The other arm 120 of member 117 projects through an L-shaped escutcheon plate 122, which is supported by the instrument panel of the vehicle or by any other suitable support, the end of the arm 120 being provided with a manipulating handle 123. The arm 120 projects through a horizontally arranged slot 124 in plate 122 the ends of the slot being formed with vertical recesses or notches 125 and 126 arranged to selectively receive and hold member 116 in either "pawl lock" or "pawl release" position.

In the operation of this form of the invention the parts in the position indicated in Figure 7 are in "brake released" position, and the vehicle operator desiring to "set" the brakes applies foot pressure to the pad 97 to rotate the lever 92 in a clockwise direction as viewed in Figure 7 about its fulcrum pin 91. During this movement, the pawl tooth over-rides the teeth 103 until the lever is moved to "brake setting" position, the pawl tooth 102 engaging one of the teeth 103 under the influence of spring 104 serves to retain the lever in this position. During this movement of the lever to "brake setting" position manipulating member 116 is in the position shown in Figures 7 and 8. When it is desired to "release" the brakes, the operator moves the member 120 by means of handle 123 along the slot 124 in a right hand direction as viewed in Figure 8. This movement causes a corresponding movement of arm 110 causing the lateral projection 112 thereof to engage the rear portion 113 of pawl 101 to disengage the pawl tooth 102 from the serrated portion 103 thus permitting the lever 92 to return to "brake released" position under the influence of the spring 33 shown in Figure 1. When it is desired to utilize the arrangement of the invention as a service brake, the pawl 101 may be retained in a position out of engagement with the serrated surface 102 by moving handle 123 to the right hand position of the slot 124 until arm 120 of member 116 engages in notch 126. With the pawl 101 held out of engagement with clutch surface 102, the pedal lever 92 when moved to brake setting position is not retained in such position but returns to its normal position shown in Figure 7 upon removal of foot pressure upon the pad 97.

Figure 12 illustrates a modified form of manually operated pawl releasing means wherein the manipulating rod 130 has a laterally extending portion 131 projecting into a circular opening in the lower end of arm 110' and normally in alignment with the fulcrum of the pedal lever 92'. Secured to the support 90' is a bracket 132 having a depending portion 133 which is provided with an opening to slidably receive rod 130, the extremity of the latter being provided with a knob or handle 71' held in place by means of a pin 72'. Secured to bracket 132 by means of a rivet 135 is a flexible locking plate 136 having its end portion configurated to form a detent 137. The rod 130 is provided with a recess or notch 138 so that when the handle 71' is moved away from bracket 132, the detent portion 137 of spring plate 136 engages in the recess 138 thus retaining the pawl 101' out of the locus of the clutching surface 103' so that the pedal lever may be used as a service brake pedal. When the arrangement is employed as an emergency brake control, the manually controlled rod 130 is maintained in the position shown in full lines in Figure 12 so that the pawl 101' may lock the lever 92' in "brake set" position. Withdrawal of the rod 130 serves to disengage the pawl 101' from the clutching surface 103' so that the lever 92' may return to normal or "brake released" position.

It is apparent that, within the scope of the invention, modifications and different arrangements may be made other than is herein disclosed, and the present disclosure is illustrative merely, the invention comprehending all variations thereof.

What I claim is:

1. In combination, a relatively stationary support; a serrated clutching surface associated with said support; a foot operated lever member pivotally carried on said support adapted to be connected to mechanism to be actuated; a clutch member carried by said lever member and arranged for cooperation with the serrated clutching surface in any position of the lever member; an arm pivotally supported on said lever member; means connecting said arm with said clutch member; resilient means for normally urging said clutch member into engagement with the serrated clutching surface; and manually operated means connected to said arm for disengaging said clutch member from the serrated clutching surface.

2. In combination, a relatively stationary support; a serrated clutching surface associated with said support; a foot operated lever member pivotally carried on said support adapted to be connected to mechanism to be actuated; a clutch member carried by said lever member and arranged for cooperation with the serrated clutching surface; a bell crank pivotally supported on said lever member; a link connecting said bell crank with said clutch member; spring means associated with said link for normally urging said clutch member into engagement with the serrated clutching surface; and manually operated means connected to said bell crank substantially in alignment with the fulcrum of the lever member for disengaging said clutch member from the serrated clutching surface.

3. In combination, a relatively stationary support; a serrated clutching surface associated with said support; a foot operated lever member having a foot pad portion and articulately associated with said support adapted to be connected to mechanism to be actuated; a clutch member pivotally carried by said lever member and arranged for cooperation with the serrated clutching surface, means for resiliently urging said clutch member into engagement with the serrated clutching surface; and manually operated means for disengaging said clutch member from the serrated clutching surface.

4. In combination, a relatively stationary support; a serrated clutching surface associated with said support; a foot operated lever member having a foot pad portion and articularly associated with said support adapted to be connected to mechanism to be actuated; a clutch member pivotally carried upon said lever member and arranged for cooperation with the serrated clutching surface in any position of said lever member, resilient means for normally urging said clutch member into engagement with the serrated clutching surface; an element pivotally supported on said lever member and arranged for engagement with said clutch member for disengaging said clutch member from the serrated clutching surface; and manually operated means connected to said element for actuating the latter.

5. In combination, a relatively stationary support; a serrated clutching surface associated with said support; a foot operated lever member having a foot pad portion and pivotally mounted on said support adapted to be connected to mechanism to be actuated; a clutch member pivotally carried by said lever member and arranged for cooperation with the toothed clutching surface; means for normally urging said pawl into engagement with the serrated clutching surface; an arm carried on said lever member; said arm being arranged whereby pivotal movement thereof independently of said lever member moves said clutch member out of engagement with the serrated clutching surface; manually operated means connected to said arm for moving said arm independently of said lever member, and means associated with said manually operated means for retaining the latter in pawl disengaging position.

6. In combination, a relatively stationary support; a toothed clutching surface associated with said support; a foot operated lever member having a foot pad portion and pivotally mounted on said support adapted to be connected to mechanism to be actuated; a pawl pivotally carried by said lever member and arranged for cooperation with the toothed clutching surface; spring means for normally urging said pawl into engagement with the toothed clutching surface; an arm pivotally carried on said lever member; said arm being arranged whereby pivotal movement thereof independently of said lever member moves said pawl out of engagement with the toothed clutching surface; and manually operated means connected to said arm at a point substantially in alignment with the pivotal support of said lever member for moving said arm independently of said lever member, and means associated with said manually operated means for retaining the latter in pawl disengaging position.

7. In combination, a relatively stationary support; a toothed clutching surface associated with said support; a foot operated lever member having a foot pad portion and pivotally mounted on said support adapted to be connected to mechanism to be actuated; said lever member being formed of a pair of channel shaped similar sections having their bight portions secured together, the upper portions of said sections being spaced and straddling said support; a pawl pivotally carried by said lever member and arranged for cooperation with the toothed clutching surface; means for normally urging said pawl into engagement with the toothed clutching surface; an arm pivotally carried on said lever member; said arm being arranged whereby pivotal movement thereof independently of said lever member moves said pawl out of engagement with the toothed clutching surface; and manually operated means connected to said arm for moving said arm independently of said lever member.

8. In combination, a relatively stationary support; a toothed clutching surface associated with said support; a foot operated lever member pivotally mounted on said support adapted to be connected to mechanism to be actuated; said lever member being formed of a pair of channel shaped similar sections having their bight portions secured together, the upper portions of said sections being spaced and straddling said support; a pawl pivotally carried by said lever member and arranged for cooperation with the toothed clutching surface in any position of the lever member; spring means for normally urging said pawl into engagement with the toothed clutching surface; an arm pivotally carried on said lever member; said arm being arranged whereby pivotal movement thereof independently of said lever member moves said pawl out of engagement with the toothed clutching surface; and manually operated means connected to said arm at a point substantially in alignment with the pivotal support of said lever member for moving said arm independently of said lever member, and means associated with said manually operated means for retaining the latter in pawl disengaging position.

9. In combination, a relatively stationary support; a toothed clutching surface associated with said support; a foot operated lever member pivotally mounted on said support adapted to be connected to mechanism to be actuated; a pawl pivotally carried by said lever member and arranged for cooperation with the toothed clutching surface; spring means for normally urging said pawl into engagement with the toothed clutching surface; an arm pivotally carrier on said lever member; a link connecting said pawl and said arm; said arm being arranged whereby pivotal movement thereof independently of said lever member moves said pawl out of engagement with the toothed clutching surface; a manually operated member having articulated connection with said arm a bracket secured to said relatively stationary support and arranged to support said manually operated member; and resilient means engageable with said link for normally urging said manually operated member toward pawl engaging position.

10. In combination, a relatively stationary support; a toothed clutching surface associated with said support; a foot operated lever member pivotally mounted on said support adapted to be connected to mechanism to be actuated; a pawl pivotally carried by said lever member and arranged for cooperation with the toothed clutching surface; spring means for normally urging said pawl into engagement with the toothed clutching surface; an arm pivotally carried on said lever member; said arm being arranged whereby pivotal movement thereof independently of said lever member moves said pawl out of engagement with the toothed clutching surface; a manually operated member having articulated connection with said arm on an axis substantially in alignment with the pivotal support of said lever member for moving said arm independently of said lever member; a bracket arranged to support said manually operated member; a hand grip element secured to said manually operated member; and means associated with said bracket for retaining said manually operated member in pawl disengaging position.

11. In combination, a relatively stationary support; a toothed clutching surface associated with said support; a foot operated lever member pivotally mounted on said support adapted to be connected to mechanism to be actuated; said lever member being formed of a pair of similarly shaped channel sections having their bight portions secured together, the upper portions of said sections being spaced and straddling the toothed clutching surface; a pawl pivotally carried by said lever member and arranged for cooperation with the toothed clutching surface; spring means for normally urging said pawl into engagement with the toothed clutching surface; an arm pivotally carried on said lever member; said arm being arranged whereby pivotal movement thereof independently of said lever member moves said pawl out of engagement with the toothed clutching surface; a manually operated member having articulated connection with said arm on an axis substantially in alignment with the pivotal support of said lever member for moving said arm independently of said lever member; a bracket secured to said relatively stationary support and arranged to support said manually operated member; a hand grip element secured to said manually operated member; means associated with said bracket for retaining said manually operated member in pawl disengaging position; and resilient means for normally urging said manually operated member toward pawl engaging position.

WILLARD C. SKAREEN.